United States Patent [19]
Fitzpatrick

[11] Patent Number: 5,185,570
[45] Date of Patent: Feb. 9, 1993

[54] TELECOMMUNICATIONS SIGNAL DETECTOR

[75] Inventor: John W. Fitzpatrick, Franklin Square, N.Y.

[73] Assignee: Helmuth J. Katz, Warwick, N.Y.

[21] Appl. No.: 478,795

[22] Filed: Feb. 12, 1990

[51] Int. Cl.⁵ .......................................... G01R 19/155
[52] U.S. Cl. .................................. 324/133; 324/508; 324/556; 340/654; 362/800
[58] Field of Search ............... 324/133, 508, 538, 542, 324/555, 556, 72.5; 340/650, 652, 654, 656, 815.12, 815.14, 815.15, 815.16, 815.2; 379/2, 20, 21, 26; 439/490, 910, 912; 362/800

[56] References Cited

U.S. PATENT DOCUMENTS

| | | | |
|---|---|---|---|
| 2,762,999 | 9/1956 | Huber | 340/815.14 |
| 2,956,229 | 10/1960 | Henel | 324/133 |
| 3,196,424 | 7/1965 | Hardesty et al. | |
| 3,229,083 | 1/1966 | George, Jr. | 340/815.12 X |
| 3,489,891 | 1/1970 | Altissimo | 340/815.14 X |
| 3,611,132 | 9/1969 | Wright et al. | |
| 3,631,477 | 12/1971 | Matsushima | 340/815.14 |
| 3,657,650 | 4/1972 | Arndt | |
| 3,795,863 | 3/1974 | Umeda et al. | |
| 3,796,951 | 3/1974 | Joseph | |
| 3,803,488 | 4/1974 | Stevens | 324/133 |
| 3,919,631 | 11/1975 | Brown | |
| 4,084,134 | 4/1978 | Nagano | |
| 4,105,968 | 8/1978 | Mobley et al. | |
| 4,150,332 | 4/1979 | Gris | |
| 4,152,643 | 5/1979 | Schweitzer, Jr. | |
| 4,195,330 | 3/1980 | Savage, Jr. | 362/800 X |
| 4,206,493 | 1/1980 | Towne et al. | |
| 4,209,671 | 6/1980 | Charles et al. | 324/133 X |
| 4,363,087 | 12/1982 | Graham et al. | 362/800 X |
| 4,564,728 | 1/1986 | Romano | 179/175.3 |
| 4,600,810 | 7/1986 | Feldman et al. | 179/175.3 |
| 4,712,163 | 12/1987 | Oxley | 362/800 X |
| 4,756,017 | 7/1988 | Bush | 379/22 |
| 4,829,407 | 5/1989 | Bushell et al. | 362/800 X |
| 4,839,599 | 6/1989 | Fischer | 324/542 |
| 4,920,555 | 4/1990 | Ingalsbe | 379/21 |
| 4,990,108 | 2/1991 | Sakaguchi | 439/910 X |

FOREIGN PATENT DOCUMENTS 1124095 2/1962 Fed. Rep. of Germany ...... 340/654

OTHER PUBLICATIONS

1987 Fordham Radio Catalog, p. 46.

Primary Examiner—Jack B. Harvey
Attorney, Agent, or Firm—Pennie & Edmonds

[57] ABSTRACT

A telecommunication signal detector consists of a light emitting diode attached to a standard connector plug which maybe temporarily connected to the telecommunications equipment to be tested. The light emitting diode illuminates to indicate the presence of a signal. In this manner, the telecommunications equipment maybe tested for signal presence by a small and inexpensive device without interruption of operation.

19 Claims, 1 Drawing Sheet

U.S. Patent  Feb. 9, 1993  5,185,570
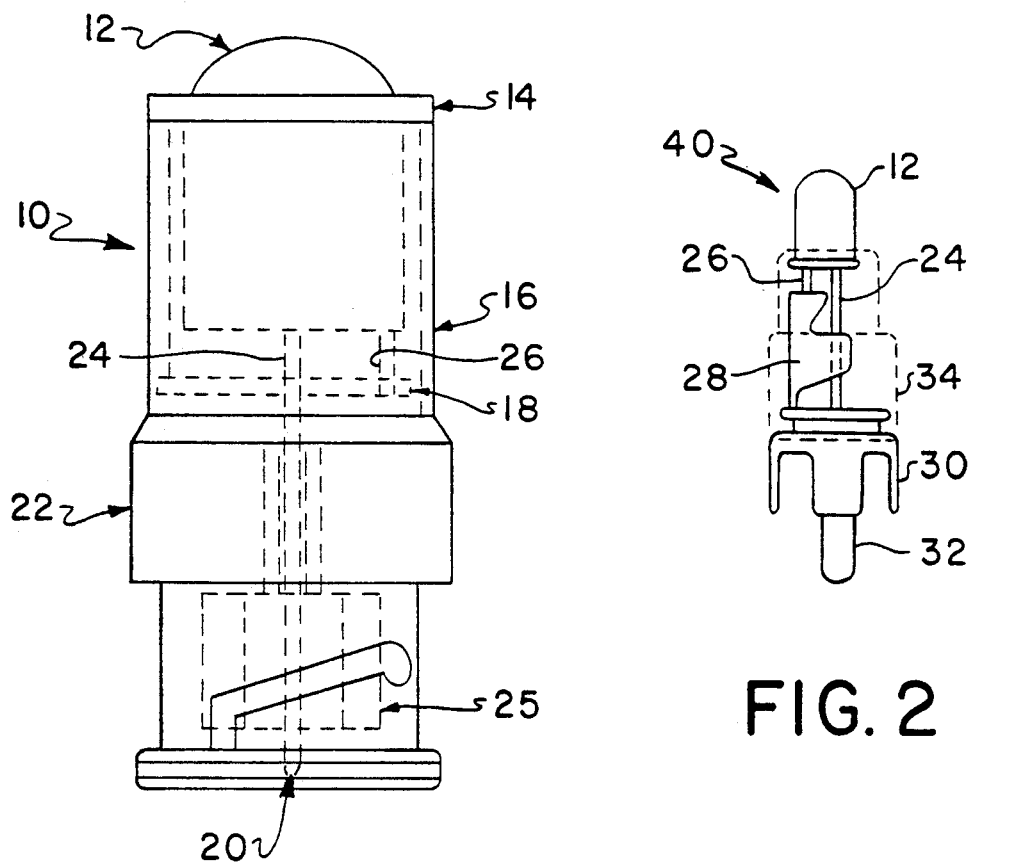
FIG. 1
FIG. 2
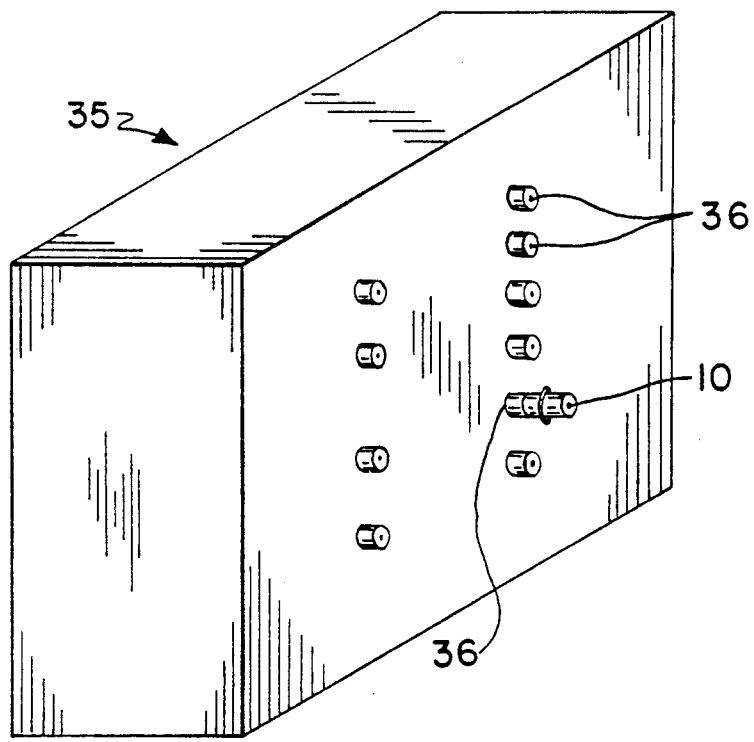
FIG. 3

TELECOMMUNICATIONS SIGNAL DETECTOR

TECHNICAL FIELD

The invention relates to test equipment for telecommunications equipment and more particularly to, a small and inexpensive, lightweight, portable, simple device for continuously monitoring signal presence in telecommunications lines or equipment.

BACKGROUND TO THE INVENTION

In the telecommunications industry known devices for monitoring equipment and testing for signal presence have a number of disadvantages. The equipment is generally relatively bulky and heavy, requiring large amounts of heavy equipment to be carried by service personnel. Also, known test equipment sometimes requires that the telecommunications equipment to be tested be turned off or otherwise rendered inoperable while the test equipment is installed and utilized. This causes the testing of a large piece of telecommunications equipment having many circuits to be a slow and tedious operation. Frequently it is necessary to check a large number of circuits for signal presence before repair work can begin, with known test equipment this is a cumbersome process.

It is therefore and an object of the invention to provide the small and inexpensive means for detecting signal presence in telecommunications equipment.

A further object of the invention to provide a means for detecting signal presence in telecommunications equipment which may be accomplished without the interruption of operation of the equipment tested.

SUMMARY

Accordingly, in the present invention a light emitting diode is attached to an appropriate connector means, for example, such as a standard BNC connector or RCA plug. Utilizing this small and inexpensive device, a method for detecting signal presence in telecommunications equipment may be accomplished by connecting the device to existing output ports on telecommunications equipment and observing the light emitting diode which illuminates if a signal is present in the circuit.

BRIEF DESCRIPTION OF THE DRAWING

The features and advantages of the invention will be more readily apparent from following detailed description of the preferred embodiments illustrated in the drawing FIGURES, wherein:

FIG. 1 shows a schematic side view of one form of the apparatus or the present invention;

FIG. 2 shows a schematic side view of an alternative of the apparatus or the present invention; and FIG. 3 illustrates a typical telecommunications equipment with the apparatus of the present invention installed thereon.

DETAILED DESCRIPTION OF THE INVENTION

An embodiment of the invention using the standard BNC connector is shown in FIG. 1. The telecommunications signal detector according to this embodiment of the invention consists of a light emitting diode (LED) 12 mounted on a BNC connector 22. LED lead 24 connects to the BNC center pin 20 which provides electrical connection to the equipment to be tested. LED ground lead 26 connects with a BNC washer 18 which rests on the BNC connector shell 16 to provide a ground connection with the telecommunications equipment to be tested. A torroidal insulator 25 separates the center pin 20 from the shell 16.

FIG. 2 shows one of many possible alternative embodiments of the present invention. In this case, the signal detector 10 consists of LED 12 having positive lead 24 and ground lead 26. LED positive lead 24 connects to center pin 32 of the RCA plug 34 to provide positive connection with the equipment to be tested. LED ground lead 26 is connected to RCA plug ground lead 28 which in turn communicates with ground connections 30 of the RCA plug 34.

In operation, the present invention provides a simple method of testing for signal presence in telecommunications lines or equipment. Referring to FIG. 3, telecommunications equipment 35 is equipped with standard output ports 36. The signal detector 10 is attached to a standard output port 36. If there is a signal present in the circuit to which the signal detector 10 is connected by means of the output port 36 the LED 12 will become illuminated. If the LED 12 fails to illuminate, it indicates either a break in the circuit of the equipment 35 being monitored or a break in the telecommunication line leading to the equipment. The problem may be isolated by jumping out the equipment and connecting the signal detector 10 directly to the suspect line. Illumination of the LED 12 would then indicate that the circuit break existed in the equipment 34 and not the line.

By use of an LED additional information is provided other than simply the presence of a signal. High frequency signals will cause the LED to illuminate constantly, while low frequency signals will cause a blinking illumination. By moving the signal detector 10 from one port 36 to another the exact location of a signal break in the telecommunications equipment may be located.

It should be apparent to those skilled in the art that the connector means specifically described herein are described only by way of example. A wide variety of connectors and plugs may be utilized according to the invention. It will also be apparent to those skilled in the art how a particular connector means may be used, in the present invention, by reference to the above specification. The specification is in no way intended to limit the scope of the invention, which scope is set forth in the appended claims.

What is claimed is:

1. An apparatus for testing of telecommunications equipment to determine the presence of electrical signals consisting of:
    (a) a detachable electrical connector means;
    (b) a light emitting diode having a light emitting surface which forms an external surface of the apparatus for viewing thereof, the diode being connected directly to and in electrical communication with the detachable electrical connector means; and
    (c) housing means for supporting and handling the connector means and diode, whereby the light emitting diode may be temporarily in electrical communication with the telecommunications equipment thereby indicating signal presence without interrupting operation.

2. The apparatus as in claim 1 wherein the light emitting diode is permanently affixed to the electrical connector means.

3. The apparatus as in claim 1 wherein the light emitting diode has a ground lead and a positive lead, and further wherein the detachable connector means comprises:
   (a) an outer shell providing a ground connection to the telecommunications equipment;
   (b) a means for ensuring electrical connection between the ground lead and the shell;
   (c) a center pin permanently affixed directly to the positive lead and providing positive electrical connection between the positive lead and the telecommunications equipment; and
   (d) an insulating means surrounding the positive lead and the center pin thereby preventing short circuit of the connector means.

4. The apparatus as in claim 1 wherein the light emitting diode has a ground lead and a positive lead and further wherein the connector means comprises:
   (a) a slotted cylindrical portion providing ground connection to the telecommunications equipment;
   (b) a rigid finger portion in electrical connection with and extending from the cylindrical portion, said finger portion being directly and permanently electrically connected to the ground lead; and
   (c) a pin insulatingly connected to and extending from the cylindrical portion in a direction opposite the finger portion, said pin being directly and permanently electrically connected to the positive lead to provide electrical connection between the positive lead and the telecommunications equipment.

5. The apparatus of claim 1 wherein the connector means is a BNC connector.

6. The apparatus of claim 1 wherein the connector means is an RCA plug.

7. The apparatus according to claim 1, wherein the light emitting diode is rigidly connected to the connector means.

8. A method for detecting signal presence in telecommunications equipment having electrical circuits and outlet or test ports in electrical communication with said circuits, comprising the steps of:
   releasably connecting the apparatus of claim 1 in electrical communication to an outlet or test port of said equipment; and
   detecting the presence of a signal by observing the light emitting diode for illumination, whereby the apparatus may be electrically disconnected after completion of the detecting step.

9. The method of claim 8 further comprising the additional step of continuously operating the equipment before, during and after connecting the apparatus thereto without interrupting the signals passing through the circuits.

10. The method of claim 8 further comprising the additional step of sequentially moving the apparatus from one output or test port to another to thereby isolate a signal break.

11. The method of claim 8 wherein the light emitting diode detects high frequency signals by providing continuous illumination.

12. The method of claim 8 wherein the light emitting diode detects low frequency signals by providing intermittent illumination.

13. The method of claim 8 further comprising the additional step of connecting the apparatus to an input line of the telecommunications equipment to thereby isolate a signal break.

14. A method for detecting signal presence in telecommunications equipment having electrical circuits and outlet or test ports in electrical communication with said circuits, comprising the steps of:
   releasably connecting an apparatus consisting of (a) a detachable electrical connector means; (b) a light emitting diode connected directly to and in electrical communication with the detachable electrical connector means; and (c) housing means for supporting and handling the connector means and diode, in electrical communication to an outlet or test port of said equipment; and
   detecting the presence of a signal by observing the light emitting diode for illumination, whereby the apparatus may be electrically disconnected after completion of the detecting step.

15. The method of claim 14 further comprising the additional step continuously operating the equipment before, during and after connecting the apparatus thereto without interrupting the signals passing through the circuits.

16. The method of claim 14 further comprising the additional step of sequentially moving the apparatus from one output or test port to another to thereby isolate a signal break.

17. The method of claim 14 wherein the light emitting diode detects high frequency signals by providing continuous illumination.

18. The method of claim 14 wherein the light emitting diode detects low frequency signals by providing intermittent illumination.

19. The method of claim 14 further comprising the additional step of connecting the apparatus to an input line of the telecommunications equipment to thereby isolate a signal break.

* * * * *